(12) United States Patent
Lechner

(10) Patent No.: US 6,233,579 B1
(45) Date of Patent: May 15, 2001

(54) METHOD FOR STORING DATA

(75) Inventor: Ulrich Lechner, Oettingen (DE)

(73) Assignee: Grau Software GmbH (DE)

( * ) Notice: Subject to any disclaimer, the term of this patent is extended or adjusted under 35 U.S.C. 154(b) by 0 days.

(21) Appl. No.: 09/123,671

(22) Filed: Jul. 28, 1998

(30) Foreign Application Priority Data

Mar. 13, 1998 (DE) ............................................. 198 11 035

(51) Int. Cl.[7] ................................................. G06F 17/30
(52) U.S. Cl. ........................... 707/100; 375/222; 380/268
(58) Field of Search ........................ 707/1–10, 100–104, 707/200–206; 375/222, 240, 316, 326; 348/14; 380/268

(56) References Cited

U.S. PATENT DOCUMENTS

| | | | |
|---|---|---|---|
| 3,876,978 | 4/1975 | Bossen et al. | 340/146.1 AG |
| 4,860,133 | 8/1989 | Baranski | 360/92 |
| 5,235,645 | * 8/1993 | Stocker | 380/268 |
| 5,323,327 | 6/1994 | Carmichael et al. | 364/478 |
| 5,347,305 | * 9/1994 | Bush et al. | 348/14 |
| 5,456,528 | 10/1995 | Dalziel | 312/9.46 |
| 5,666,170 | * 9/1997 | Stewart | 375/326 |
| 5,671,253 | * 9/1997 | Stewart | 375/316 |
| 5,790,599 | * 8/1998 | Wright et al. | 375/240 |
| 6,044,107 | * 3/2000 | Gatherer et al. | 375/222 |

FOREIGN PATENT DOCUMENTS

| | | | |
|---|---|---|---|
| 2421 112 C2 | 1/1975 | (DE) | G06F/11/00 |
| 44 05 363 A1 | 8/1995 | (DE) . | |
| 5-274760A | 10/1993 | (JP) | G11B/15/68 |

* cited by examiner

*Primary Examiner*—Ruay Lian Ho
(74) *Attorney, Agent, or Firm*—Sheridan Ross P.C.

(57) ABSTRACT

In order to make available a method for storing data in the form of a plurality of data sequences on a plurality of data carriers, which makes possible a restoration of data which is as reliable and simple to carry out as possible, it is suggested that a defined number from the plurality of data sequences be combined to form a respective data group, that a test data sequence be generated for the data sequences of the data group which allows the reconstruction of data in that the test data sequence and the other data sequences are combined with one another, that the test data sequence be generated by allocating a preliminary test data sequence to one of the data sequences, and that the preliminary test data sequence, by taking into account this and an additional data sequence from the data group, be extended to this additional data sequence and that the preliminary test data sequence be extended to additional data sequences of the data group for such a time until this comprises all the data sequences of the data group.

29 Claims, 5 Drawing Sheets

METHOD FOR STORING DATA

The invention relates to a method for storing data in the form of a plurality of data sequences on a plurality of data carriers in order to be able to make the data of the data sequences available again following a loss of data.

In the methods known so far for storing data sequences there is always the problem of being able to make the data of the data sequences available again in as simple a manner as possible following a loss of data.

The object underlying the invention is therefore to provide a method for restoring data following a loss of data which is as reliable and simple to carry out as possible.

This object is accomplished in accordance with the invention, in a method of the type described at the outset, in that a defined number from the plurality of data sequences is combined to form a respective data group, that a test data sequence is generated for the data sequences of the data group and stored in addition, this test data sequence allowing the reconstruction of data from one of the data sequences in that the test data sequence and the other data sequences are combined with one another, that the test data sequence is generated by allocating a preliminary test data sequence to one of the data sequences and that the preliminary test data sequence, by taking into account this and an additional data sequence from the data group, is extended to this additional data sequence and that the preliminary test data sequence is extended to additional data sequences of the data group for such a time until this comprises all the data sequences of the data group.

The advantage of the inventive solution is to be seen in the fact that with it an advantageous possibility exists of generating a test data sequence which includes all the data sequences of a data group without it being necessary to keep all the data sequences of the data group ready for access in parallel in order to generate the test data sequence.

A particular advantage of the inventive method is to be seen in the fact that the data sequences of a data group need not have any correlation with respect to content and so optional data sequences can be combined to form data groups and the respective test data sequences compiled for them.

In principle, it would, however, also be possible with the inventive method to always extend the preliminary,test data sequence to several data sequences of the data group in each step during its generation. This does, however, make it necessary to keep all the data sequences, to which the preliminary test data sequence is intended to be extended, ready for access in parallel.

For this reason, the inventive method is particularly advantageous when the respective preliminary test data sequence is extended to only one of the additional data sequences.

With respect to storing the test data sequence, no further details have so far been given. It would be conceivable, for example, to also store the preliminary test data sequence on a data carrier which can be handled individually. A particularly favorable solution provides, however, for the preliminary test data sequence to be stored on an intermediate storage means.

This may be carried out in a particularly favorable manner when the intermediate storage means is established on a data carrier separate from the data carriers for the data group.

In this respect, the intermediate storage means is preferably established on a hard disk memory.

With respect to the type of storage of the data sequences themselves, no further details have so far been given. It could be provided, for example, for a data carrier to have several data sequences.

The inventive method may be carried out, however, in a particularly favorable manner when each data sequence of a data group is arranged on a separate data carrier so that the number of data sequences combined to form the data group is equal to the number of data carriers belonging to this data group. The data of an entire data carrier can thus be reconstructed when this is no longer available.

With respect to the arrangement of the data carriers, no further details have so far been given. These data carriers could, for example, likewise be hard disk memories. However, the inventive method is particularly suitable for the case where each of the data carriers is an interchangeable data carrier, for example, a removable hard disk, a magnetooptical data carrier or is arranged in a data carrier cassette which can be handled in an archive storage means.

With respect to the procedure during the inventive generation of test data sequences, the most varied of solutions are conceivable. It would be conceivable, for example, to generate the corresponding preliminary test data sequence immediately after generation of the individual data sequences and to extend this for such a time until all the data sequences of a data group are included.

This method does, however, have the disadvantage that with it storage of incoming data in the form of data sequences is possible either at a slower speed or with greater computer power.

For this reason, a particularly advantageous embodiment provides for incoming data to be written onto the data carriers first of all in the form of the data sequences and for the data sequences of a data group to then be read from the data carriers in non-active or less active periods of time of the computer or in times of less activity of the data storage unit and the test data sequence to be generated via the preliminary test data sequences. Furthermore, this method has the advantage that the written data is automatically checked with respect to its readability.

Also when the data sequences are being written onto the data carriers it would be conceivable, for example, especially when a rapid storage of data is required, for several data sequences to be written onto several data carriers at the same time.

The inventive method may, however, be realized more advantageously when the data sequences are written onto the data carriers one after the other.

In the same way, it would be possible to proceed during the generation of the preliminary test data sequences such that several data sequences are read from several data carriers at the same time. In this case, particularly in order to keep the complexity of the inventive method as low as possible, it has, however, proven to be especially advantageous when the data sequences on the data carriers are read one after the other.

The procedure explained in conjunction with the preceding embodiment to the effect that the data sequences are first written onto the data carriers and after they are read again the preliminary test data sequences and, finally, the test data sequence are then determined does, however, have the disadvantage that until the test data sequence has been determined no additional data protection is provided and so during any loss of data up to this determination of the test data sequence a restoration of the data is not possible.

For the purpose of improved data protection, it is provided in one advantageous embodiment of the inventive method that when each of the data sequences is written onto one of the data carriers this data sequence is written onto a supplementary data carrier in addition.

As a result of this, an additional data protection is attained which ensures that at any point of time the possibility exists of reconstructing lost data again.

In order to keep the storage capacity during such writing of the data sequences onto a supplementary data carrier as small as possible, it is preferably provided for the supplementary data carrier to be released after inclusion of the data sequence corresponding to this in the preliminary test data sequence.

This is possible, for example, due to the fact that following each individual inclusion of a data sequence the corresponding data sequence on the supplementary data carrier is released. It is, however, also conceivable for the corresponding data sequences on the supplementary data carriers to be released only after generation of the entire test data sequence so that even a loss of data during the generation of the test data sequence provides the possibility of reconstructing the data, where necessary of generating the entire test data sequence again.

The test data sequence determined in accordance with the invention could, for example, continue to be stored on the intermediate storage means after its generation. It is, however, particularly favorable, especially in order, again, to be able to keep the intermediate storage means as small as possible, when the test data sequence is stored on a test data carrier and deposited with the plurality of data carriers, for example, in an archive storage means as a handlable data storage means.

Alternatively or in addition to the embodiments of the inventive method explained above, the object specified at the outset is also accomplished in accordance with the invention, in a method of the type specified at the outset, in that the data sequences are stored on the data carrier in the form of practical data sections and respective control data sections locally associated therewith and that the control data sections of all the practical data sections of a data carrier are combined to form a control data sequence and stored on the data carrier at an end of the series of practical data sections.

This inventive solution relates, in particular, to the loss of control data and the rapid retrieval of practical data sections after such a loss of control data, wherein the inventive combining of the control data sections into one control data sequence offers the possibility of rapidly locating a quick overview of the practical data sections on the data carrier specified by the control data sections.

In order to provide a certain protection with respect to a loss of control data sections it is preferably provided that for each practical data section the control data section locally associated therewith is stored on the data carrier in addition.

Such an additional storage of the locally associated control data section can result either prior to or following the corresponding practical data section.

Furthermore, data protection may be increased, in addition, in that the control data sections associated with the individual practical data sections of a data carrier are stored in an intermediate storage means, allocated to this data carrier.

Such an additional storage on an intermediate storage means facilitates, in particular, the rapid location of a practical data section since rapid access to the individual control data sections is possible on the intermediate storage means.

In this respect, it is particularly advantageous when the individual control data sections are likewise stored on the intermediate storage means combined as a control data sequence allocated to the respective data carrier.

With respect to the intermediate storage means no further details have so far been given. It is particularly advantageous, especially in order to have rapid access to the control data sections, when a hard disk memory is used as intermediate storage means.

Furthermore, the content of the control data sections has not so far been specified in detail. It is advantageously provided for header information and following this data file information to be stored in each control data section.

In particular, information concerning position, length, name and time of the corresponding file is stored, inter alia, for each data file as data file information.

With respect to carrying out the inventive method in detail, no further particulars have so far been given. One advantageous embodiment, for example, provides for the data carriers to be arranged in data carrier cassettes of an archive system and for the data carrier cassettes to be stored within the archive system in a storage unit, read or written on in at least one read/write unit and transported back and forth between the read/write unit and the storage unit by a transfer unit.

Such an archive storage means has the advantage that a plurality of data carrier cassettes can be handled in it in a simple manner and thus a large amount of data can advantageously be stored.

Such an archive storage means is preferably controlled by a data storage control, wherein the data storage control, on the one hand, receives the data, for example, from a computer and, on the other hand, controls the archive storage means in such a manner that the data is stored in an inventive manner in the form of data sequences.

In this respect, it is preferably provided for the data storage control to operate in addition with an additional hard disk memory which is operated by the data storage control parallel to the archive storage means.

Such a hard disk memory preferably serves as intermediate storage means, namely in the communication with the external computer and also during the generation of the test data sequence.

Such an intermediate storage means offers itself as a favorable solution, in particular, for the generation of the preliminary test data sequences and the extension thereof.

An inventive data storage unit is preferably controlled by the data storage control in such a manner that the long-term storage of the data takes place in the archive storage means by means of the data carriers and, moreover, the data storage control communicates with the computer as a single storage unit and preferably allows an interchange of data with the computer in the order of magnitude of data interchange rates corresponding to a hard disk memory.

For this purpose, the data coming from the computer or made available to the computer is, in particular, stored temporarily in the hard disk memory and thus available for rapid communication while the transfer of the data from the hard disk memory to the archive storage means then takes place in the periods of time, in which no or only little data is being requested or transferred by the computer.

Additional features and advantages of the inventive method are the subject matter of the following description of one embodiment of an inventive data storage unit and an inventive method for storing data.

Figure 1:
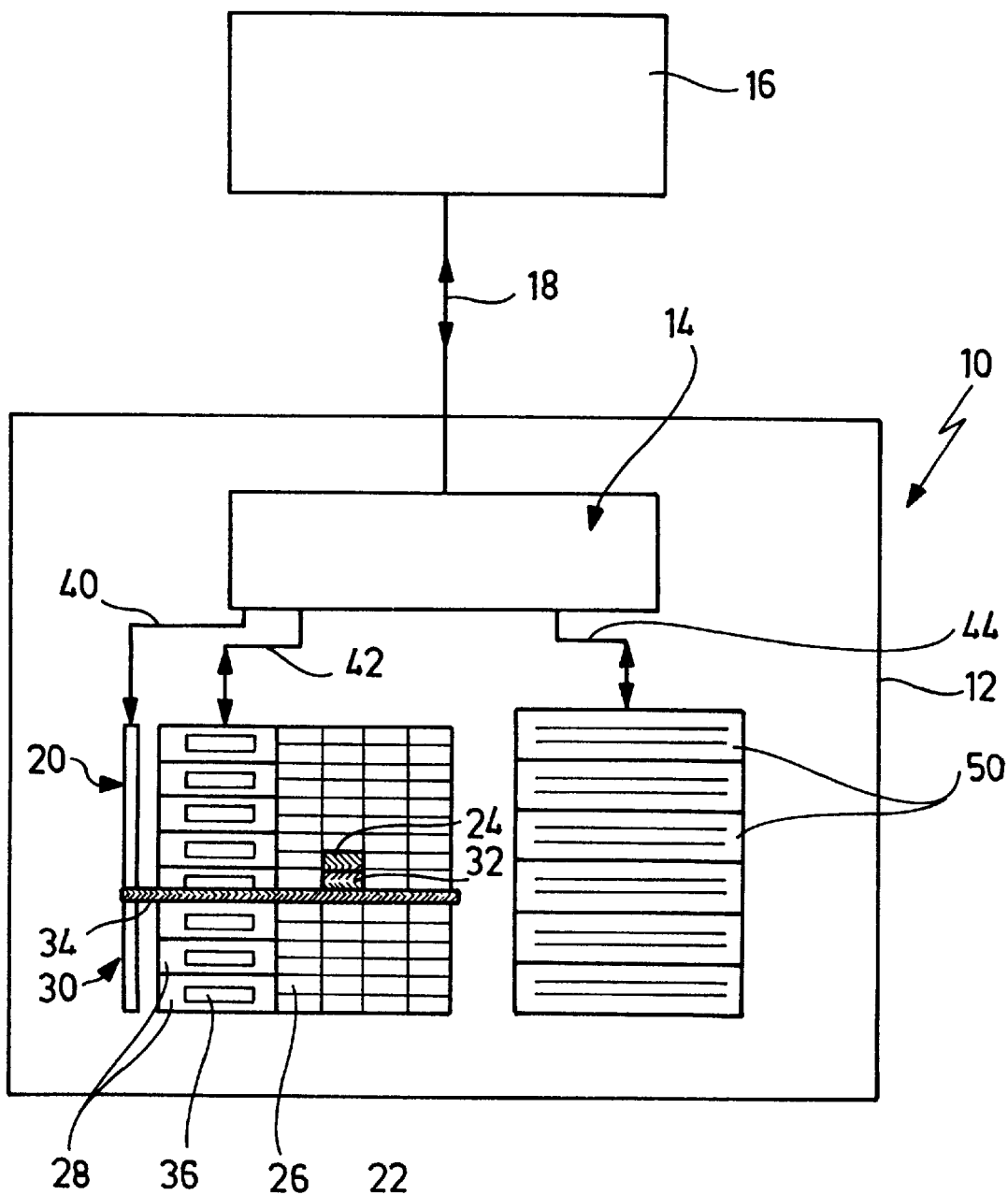
FIG. 1 shows a schematic illustration of one embodiment of the inventive storage unit in the form of blocks associated with individual units of the data storage unit as well as the communication of the inventive data storage unit with a computer.

One embodiment of an inventive data storage unit, schematically illustrated in FIG. 1 and designated as a whole as 10, comprises a frame which is schematically designated as 12 and in which a data storage control 14 is arranged, which communicates with an external computer 16 or a network and thus with several computers and interchanges data via a path 18. The data storage control 14 operates an archive storage means which is designated as whole as 20 and has a storage unit 22 for data carrier cassettes 24, wherein the storage unit 22 comprises a plurality of storage compartments 26 for data carrier cassettes 24. In addition, the archive storage means 20 comprises several read/write units 28, into which the data carrier cassettes 24 can be inserted in order to write data on them or read data from them.

In order to transport the data carrier cassettes 24 between the read/write units 28 and the storage compartments 26 of the storage unit 22, a transfer unit is provided which is designated as a whole as 30 and has, for example, a gripper means 32, with which data carrier cassettes 24 can be gripped in the storage compartments 26 of the storage unit and transported to the read/write units 28 or gripped in these read/write units 28 and transferred to the storage compartments 26.

The gripper means 32 is preferably mounted on a handling unit 34 of the transfer unit 30 and can be moved back and forth by the handling unit 34 between the storage compartments 26 and various insertion compartments 36 of the read/write units 28.

In order to insert the individual data carrier cassettes 24 into the respective read/write units 28, to write on them and read them and thereafter deposit them again in the storage compartments 26 of the storage unit 22, the data storage control 14 controls the transfer unit 30 via a communication path 40, i.e., in particular, its handling unit 34 and its gripper means 32, and the read/write units 28 via a communication path 42, wherein data to be stored on the data carrier cassettes 24 or data read from the data carrier cassettes 24 is also transferred via the communication path 42.

The data storage control 14 is connected, in addition, via a communication path 44 to several hard disk memories 50 which are likewise arranged in the frame 12 and serve to store temporarily the data transferred from the data storage control 14.

The data storage control 14 communicating with the computer 16 via the data line 18 interchanges data with the computer 16 via the path 18 at a data interchange rate as if the entire data storage unit 10 were a hard disk memory. For this purpose, the data storage control 14 first of all stores in the hard disk memories 50, for example, data transferred via the path 18 of the inventive data storage unit 10—particularly when these are sets of data which are not simply to be written successively onto one tape as a whole—in order to then transfer this data onto data carrier cassettes 24 in the various read/write units 28 when no more data is being transferred or requested by the computer 16, wherein the recorded data carrier cassettes 24 are then deposited by the transfer unit 30 in the storage compartments 26 of the storage unit 22. Should a rapid transfer of data via the data line 18 to the computer 16 be necessary, for example, when the computer 16 requests a specific type of data stored on the data carrier cassettes 24—in particular, sets of data not stored in a connected manner on a single tape—, the data storage control 14 first of all actuates the transfer unit 30 in such a manner that it locates the corresponding data carrier cassettes 24 in the respective storage compartments 26 of the storage unit 22, inserts them into the insertion compartments 36 of the read/write units 28 so that the inserted data carrier cassettes 24 can then be read in the read/write units and the data transferred to the hard disk memories 50, in which this data is then available upon request by the computer 16 at the data interchange rate customary for hard disk memories.

If, however, sets of data are intended to be stored, for example, in a connected manner one after the other on one tape or read from this tape, the data storage control 14 can also have direct access to this tape in the respective read/write unit 28 since, in this case, a data interchange rate is possible which corresponds at least to that with a hard disk memory.

Thus, it is possible altogether to carry out communication between the computer and the inventive data storage unit as a whole in such a manner as if the inventive data storage unit 10 were merely an accumulation of a plurality of hard disk memories 50 although, in the end, the data is stored securely and inexpensively for a long-term storage in data carrier cassettes 24.

In order to be able to again recover the data on data carriers 60 contained in the individual data carrier cassettes 24 at least when some of the data has been lost in the case of one data carrier 60, the data carriers 60 are combined to form data groups 62, wherein each data group 62 comprises a fixed number of data carriers $60_1$ to $60_N$ and the number N is customarily five.

A test data carrier 64 is then allocated to each of the data groups 62 and this has a test data sequence 66.

The test data sequence 66 is thereby set up such that it has test information corresponding to date sequences $70_1$ to $70_N$ stored on the data carriers $60_1$ to $60_N$.

The test information may be represented, for example, by a series of parity bits 68 which form the test data sequence 66.

Each parity bit 68 represents the parity of a running digital sum determined by corresponding bits $72_1$ to $72_N$ of the data sequences $70_1$ to $70_N$.

For example, the running digital sum is formed from the first bit $72_1$ of the first data sequence $70_1$, the first bit $72_2$ of the second data sequence $70_2$, the first bit $72_3$ of the third data sequence $70_3$ up to the first bit $72_N$ of the Nth data sequence $70_N$. The same procedure is used with the second bit of all the data sequences $70_6$ to $70_N$ and the parity information is stored as second test bit of the test data sequence 66.

It is now possible with such a test data sequence 66, for example when bits in the second data sequence $70_2$ of the second data carrier $60_2$ are lost, to reconstruct these bits, namely by using the corresponding bits of the remaining data sequences $70_1$ and $70_3$ up to $70_N$ and the test data sequence 66 and adding them up with respect to the corresponding bits.

If, for example, the first bit $72_2$ of the second data sequence $70_2$ has been lost, this may be determined and reconstructed from the first bit $72_1$ of the first data sequence 70, and the first bits $72_3$ to $72_N$ of the remaining data sequences $70_3$ to $70_N$ and the first bit 68 of the test data sequence 66 by way of summation.

The same procedure can be used for additional bits of the second data sequence $70_2$.

Such technology is described as RAIT technology, particularly in relation to storage tapes as data carriers $60_1$ to $60_N$ wherein the term RAIT represents an abbreviation of the term Redundant Array of Independent Tapes.

Figure 3:
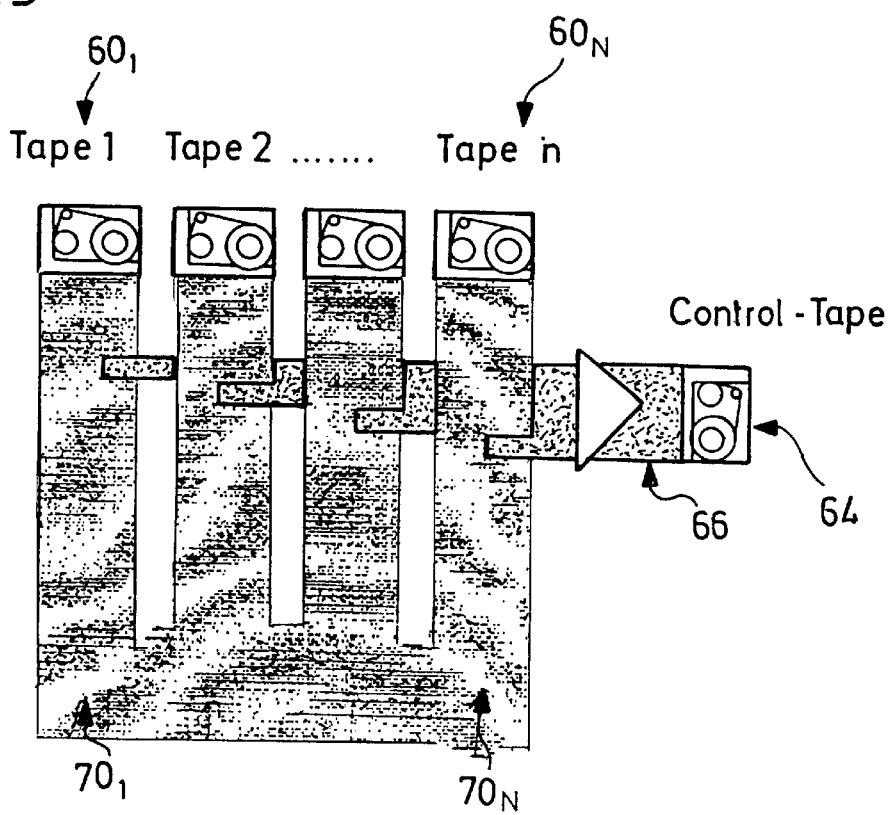
FIG. 3 shows a schematic illustration of generation of the test data sequence in accordance with the state of the art.

According to the state of the art known so far, such a test data sequence 66 is generated on the data carrier 64 in that all the data sequences $70_1$ to $70_N$ of a data group 62 are supplied to the data carriers $60_1$ to $60_N$ essentially at the same time and during this simultaneous supply of the data sequences $70_1$ to $70_N$ the corresponding test bit 68 is formed at the same time for the respective bit $72_1$ to $72_N$ supplied simultaneously and stored on the data carrier 64 within the scope of the test data sequence 66, as illustrated in FIG. 3.

The method known so far and illustrated in FIG. 3 does, however, make it necessary to have n+1 read/write units 28 available at the same time in the archive storage means 20 in order to be able to write on the data carriers $60_1$ to $60_N$ of the data group 62 and the test data carrier 64 in n+1 data carrier cassettes 24 at the same time.

The inventive solution, illustrated in FIGS. 4 to 12, provides an improved method for storing data.

Figure 4:
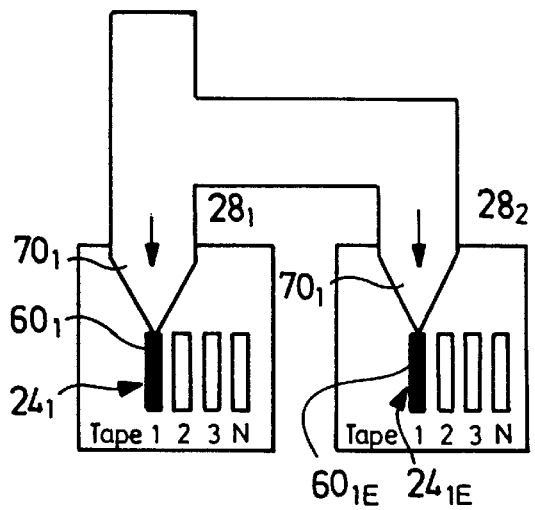
FIG. 4 to FIG. 12 show a schematic illustration of generation of a test data sequence in accordance with the present invention with simultaneous comprehensive data protection up to generation of the test data sequence.
Figure 5:
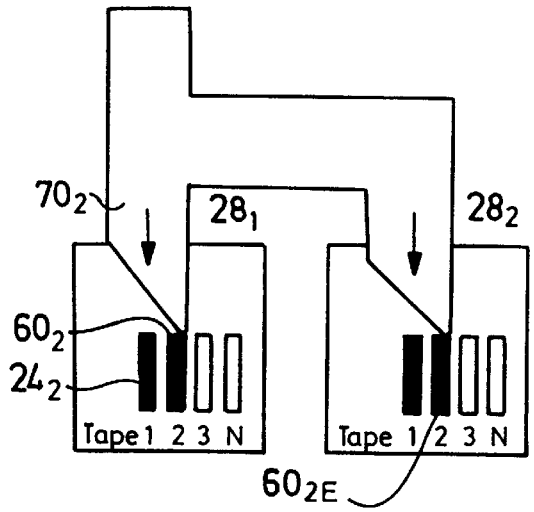

With the inventive method, the data sequence 70, is written first of all on one data carrier $60_1$, in this case a tape, of a first data carrier cassette 24, merely in a first read/write unit $28_1$, as illustrated in FIG. 4.

In order, however, to increase the data protection up to generation of the test data sequence 66, the same data sequence $70_1$ is written on a supplementary first data carrier $60_{1E}$ of a supplementary data carrier cassette $24_{1E}$ at the same time in a second read/write unit $28_2$. Thus, when data on the first data carrier $60_1$ is lost this can be recovered from the supplementary first data carrier $60_{1E}$.

After the first data carrier $60_1$ of the first data carrier cassette 24, is written on, the second data carrier cassette $24_2$ with the second data carrier $60_2$ of the data carrier group 62 is inserted in the first read/write unit $28_1$ and the second data sequence $70_2$ written on it. In the same way, a supplementary second data carrier $60_{2E}$ is written on in the second read/write unit $28_2$ for the purpose of data protection.

Figure 6:
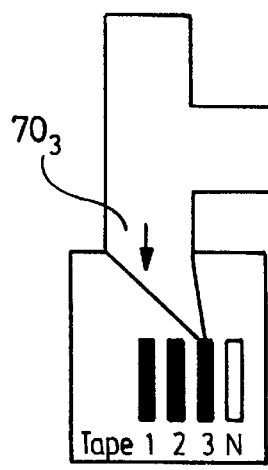
Figure 7:
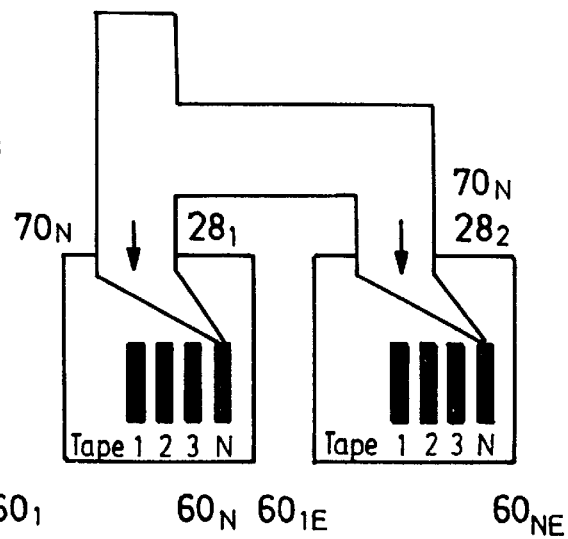

This method is, as illustrated in FIGS. 6 and 7, carried out until such a time as the data sequences $70_1$ to $70_N$ are written on all the data carriers $60_1$ to $60_N$ of the data carrier group 62 one after the other in the first read/write unit $28_1$ and, at the same time, the data sequences $70_1$ to $70_N$ are written on the supplementary data carriers $60_{1E}$ to $60_{NE}$ in the second read/write unit $28_2$.

Thus, the data storage control 14 of the inventive data storage unit 10 has first of all seen to it that all the data sequences $70_1$ to $70_N$ are recorded on the data carriers $60_1$ to $60_N$ and protected in addition by means of the supplementary data carriers $60_{1E}$ to $60_{NE}$.

Figure 8:
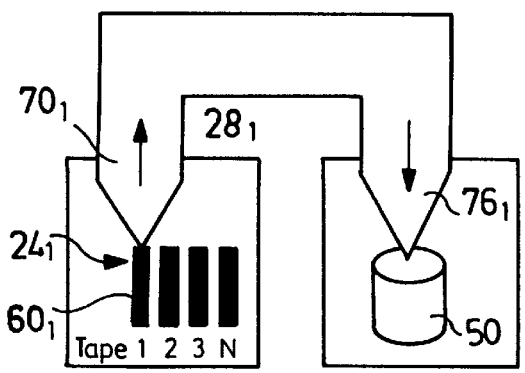

To generate the test data sequence 66, the data sequence $70_1$ is first read from the first data carrier $60_1$ by the data storage control 14, as illustrated in FIG. 8, and a first preliminary test data sequence $76_1$ is generated and stored in an intermediate storage means, for example, one of the hard disk memories 50.

For this purpose, the first data carrier cassette $24_1$ is again transported to the first read/write unit $28_1$ and inserted into it for reading. Such reading of the first data carrier cassette $24_1$ for generating the first preliminary test data sequence $76_1$ takes place, for example, during periods of time, in which the computer 16 is not communicating with the inventive data storage unit 10 or only to a small extent and has this time available for system-internal tasks.

Figure 9:
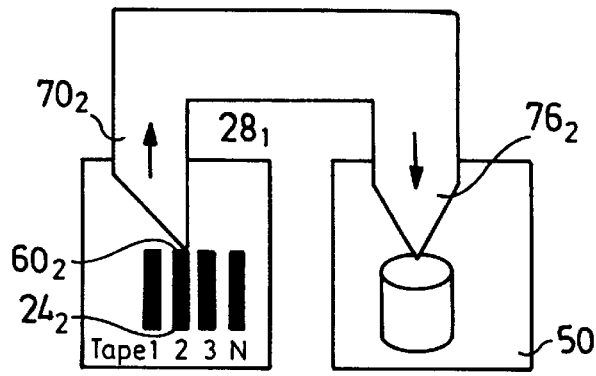

After the first data sequence $70_1$ has been read from the first data carrier $60_1$, the second data carrier cassette $24_2$ is inserted into the first read/write unit $28_1$ for reading the second data carrier $60_2$ and the data storage control 14 reads the second data sequence $70_2$ from the second data carrier $60_2$ and generates a second test data sequence $76_2$ at the same time by way of a bit-by-bit summation with the first preliminary test data sequence $76_1$, this second test data sequence resulting in the end due to a bit-by-bit summation of the first data sequence $70_1$ and the second data sequence $70_2$ and thus including these two data sequences $70_1$ and $70_2$, as illustrated in FIG. 9.

Figure 10:
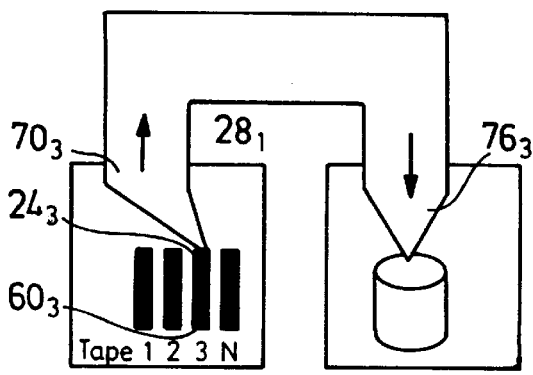
Figure 11:
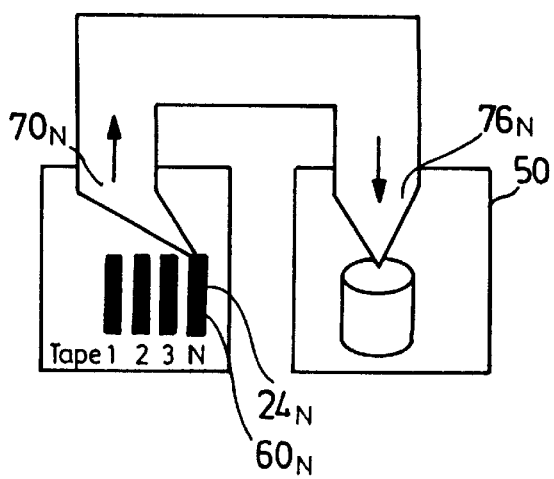
Figure 12:
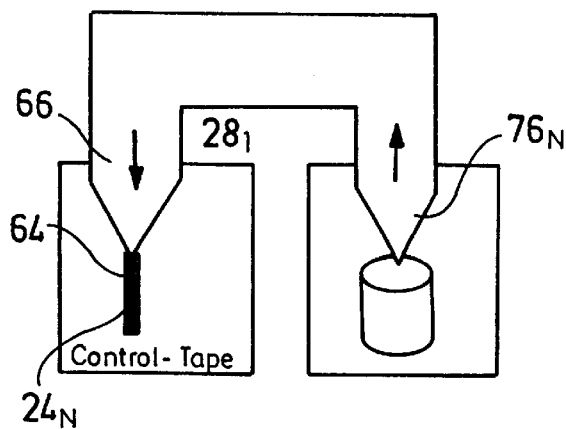

In the same way, the second data carrier cassette $24_2$ is subsequently removed from the read/write unit $28_1$ again and the third data carrier cassette $24_3$ with the third data carrier $60_3$ inserted therein so that the data storage control is now in a position to generate, by reading the third data sequence $70_3$, the third preliminary test data sequence $76_3$ which includes the three data sequences $70_1$ to $70_3$. This method is, as schematically illustrated in FIGS. 10 and 11, carried out for such a time until the data sequence $70$, of the Nth data carrier $60_N$ in the Nth data carrier cassette $24_N$ is also read and thus the Nth test data sequence $76_N$ is generated which includes all the data sequences $70_1$ to $70_N$ of all the data carriers $60_1$ to $60_N$ of the data carrier group 62.

This Nth preliminary test data sequence $76_N$ now stored temporarily on one of the hard disk memories 50 is subsequently written onto the test data carrier 64, which is contained in a data carrier cassette 24c and has been inserted into the first read/write unit $28_1$, by the data storage control 14 by means of the first read/write unit $28_1$.

Figure 2:
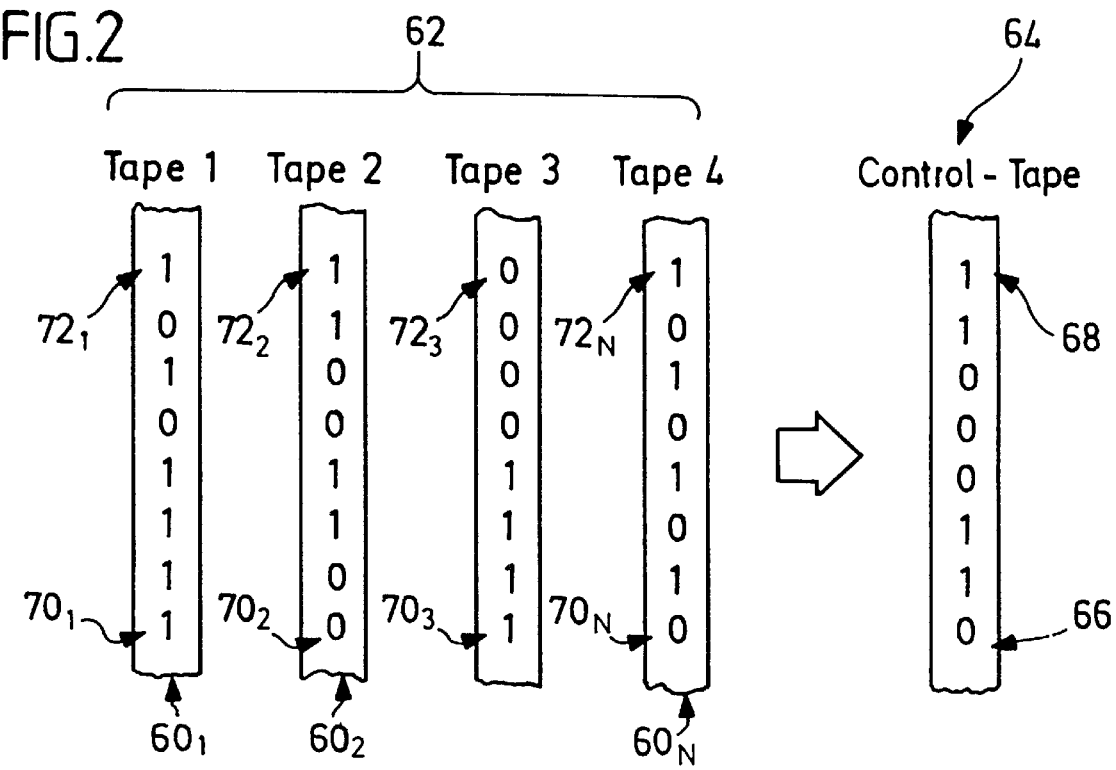
FIG. 2 shows a schematic illustration of a data group comprising data sequences and a test data sequence.

This test data sequence $76_N$ then corresponds to the test data sequence 66 which has been explained in detail in conjunction with FIG. 2 and creates the possibility of reconstructing lost data of one of the data sequences $70_1$ to $70_N$ on the data carriers $60_1$ to $60_N$ of the data carrier group 62 when this is lost.

After generation of the test data sequence 66 and storage thereof on the test data carrier 64, the supplementary data carriers $60_{1E}$ to $60_{NE}$ can continue to be stored for additional data protection or released for writing over or erased.

The inventive method now creates the possibility, as illustrated in FIGS. 4 to 12, of always storing data stored in the archive storage means 20 with sufficient data protection on the data carriers 60 in the data carrier cassettes 24 so that at no time is there any risk of losing the possibility of reconstruction due to loss of data of one of the data sequences 70, wherein the great advantage is to be seen in the fact that only one read/write unit $28_1$ has to be used for generating the test data sequence 66.

Figure 13:
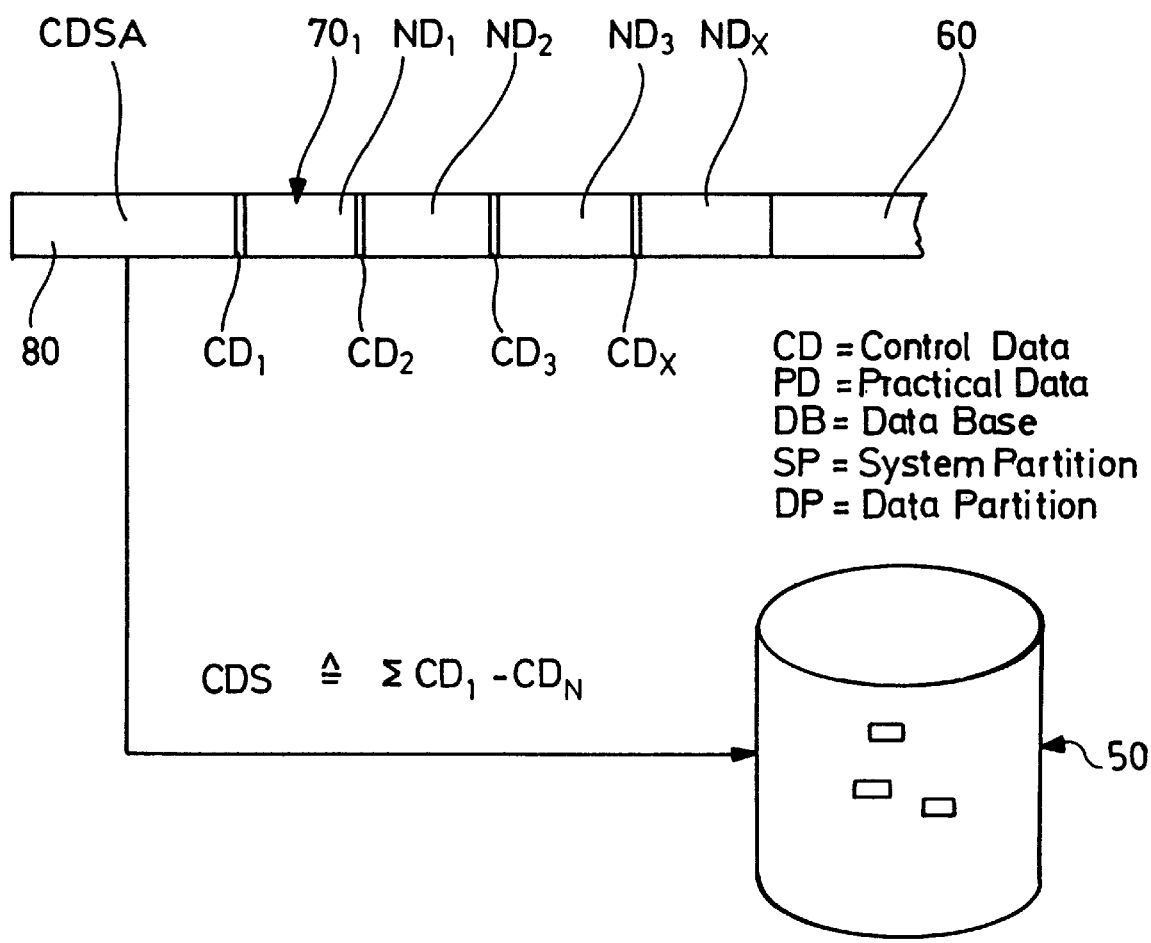
FIG. 13 shows a schematic illustration of a method for storing data with rapid access to practical data sections.

With the inventive data storage unit, a data sequence 70 is, as illustrated in FIG. 13, deposited on a data storage means 60 in the form of practical data sections ND which are preceded by control data sections CD, wherein the control data sections CD have information concerning position, length, name and time of the corresponding data files and have, in addition, a header which comprises further information.

Additional information can also be entered in the control data sections CD.

All these control data sections $CD_1$ to $CD_X$, when they are respectively arranged in front of or behind the respective practical data section $ND_1$ to $ND_X$, make the location of individual practical data sections ND time-consuming to the extent that the respective read/write unit must always go from the one control data section CD to the next control data section CD and read it in order to check whether the practical data section ND associated therewith contains the desired information. When searching for a specific practical data section ND, the read/write unit must therefore wind through the entire data carrier 60, i.e. the entire data carrier 60, and check the individual control data sections CD to this end.

In order to simplify and speed up the location of practical data sections ND, the control data sections $CD_1$ to $CD_N$ are combined and recorded, for example, on one of the hard disk memories 50 in addition to the respective data carrier 60 in the form of a control data sequence CDS which is stored on an intermediate storage means, for example, one of the hard disk memories 50, allocated to each of the data carriers 60.

In order to prevent, in addition, an irksome checking of the entire data carrier 60 being necessary to locate specific practical data ND when the control data sequence CDS in the hard disk memory 50 is lost, the control data sequence CDS is likewise stored in addition on the data carrier, namely, as illustrated in FIG. 13, at a starting end 80 of the data carrier in the form of a control data sequence section CDSA so that during th e search for a specific practical data section ND the data storage control 14 can, when the control data sequence CDS is no longer readable in the hard disk memory 50, fall back on the control data sequence section on the data carrier 60 in that the control data sequence section CDSA is read first of all after the insertion of the data carrier 60 into one of the read/write units 28 and again stored in the hard disk memory 50 and it is then possible on account of the control data in the control data sequence CDS to locate the desired practical data immediately.

Such a control data sequence section CDSA on each of the data carriers 60 makes it possible, in particular, to read the respective control data sequence sections CDSA quickly on the data carriers 60 when the control data sequence CDS in the hard disk memory 50 is lost and supplement the missing control data sequences CDS in the hard disk memory 50. This checking and supplementation of the control data sequences CDS present in the hard disk memory 50 preferably takes place prior to starting any operations of the inventive data storage unit in conjunction with the computer 16.

It is particularly favorable when the control data sequences CDS of all the data carriers 60 present in the archive storage means 20 are combined in a storage area with the respective information concerning the data carrier 60.

The control data sequence section CDSA can, however, in contrast to the embodiment illustrated in FIG. 13, be arranged in principle in several subsections distributed over the entire data carrier 60, wherein each of the subsections can, in particular, refer to the next following subsection or be arranged at the terminating end of the data carrier 60, wherein, in this case, the read/write unit 28 must first wind the data carrier 60 through to the end in order to read the control data sequence section CDSA and load this in the hard disk memory 50 again.

What is claimed is:

1. Method for storing data in the form of a plurality of data sequences on a plurality of data carriers in order to be able to make the data of the data sequences available again following a loss of data, wherein a defined number from the plurality of data sequences is combined to form a respective data group, wherein a test data sequence is generated for the data sequences of the data group and stored in addition, said test data sequence allowing the reconstruction of data from one of the data sequences wherein the test data sequence and the other data sequences are combined with one another, wherein the test data sequence is generated by allocating a preliminary test data sequence to one of the data sequences, and wherein the preliminary test data sequence, by taking into account this and an additional data sequence from the data group, is extended to this additional data sequence and wherein the preliminary test data sequence is extended to additional data sequences of the data group until this comprises all the data sequences of the data group.

2. Method as defined in claim 1, characterized in that the respective preliminary test data sequence is extended to only one of the additional data sequences.

3. Method as defined in claim 1, characterized in that the preliminary test data sequence is stored on an intermediate storage means.

4. Method as defined in claim 3, characterized in that the intermediate storage means is established on a data carrier separate from the data carriers for the data group.

5. Method as defined in claim 1 characterized in that each data sequence of a data group is arranged on a separate data carrier.

6. Method as defined in claim 1, characterized in that each of the data carriers is an interchangeable data carrier.

7. Method as defined in claim 1, characterized in that incoming data is first written onto the data carriers in the form of data sequences and then in non-active or less active periods of time the data sequences of a data group are read from the data carriers and the test data sequence is generated via the preliminary test data sequences.

8. Method as defined in claim 7, characterized in that the data sequences are written onto the data carriers one after the other.

9. Method as defined in claim 7, characterized in that the data sequences on the data carriers are read one after the other for generating the preliminary test data sequence.

10. Method as defined in claim 1, characterized in that when each of the data sequences is written onto one of the data carriers this data sequence is written onto a supplementary data carrier in addition.

11. Method as defined in claim 10, characterized in that the supplementary data carrier is released after inclusion of the data sequence corresponding thereto in the preliminary test data sequence.

12. Method as defined in claim 11, characterized in that the supplementary data carriers for a data group are released only after generation of the test data sequence for this data group.

13. Method as defined in claim 1, characterized in that the test data sequence of a data group is stored on a test data carrier and deposited with the plurality of data carriers.

14. Method for storing data in the form of a plurality of data sequences on a plurality of data carriers in order to be able to make the data of the data sequences available again following the loss of data, wherein the data sequences are stored on the data carrier in the form of practical data sections and respective control data sections locally associated therewith and that the control data sections of all the practical data sections of a data carrier are combined to form a control data sequence and stored on the data carrier at an end of the series of practical data sections.

15. Method as defined in claim 14, characterized in that for each practical data section the control data section locally associated therewith is stored on the data carrier in addition.

16. Method as defined in claim 14, characterized in that the control data sections associated with the individual practical data sections of a data earner are stored on an intermediate storage means, allocated to this data carrier.

17. Method as defined in claim 16, characterized in that the control data sections are stored on the intermediate storage means combined as a control data sequence allocated to the respective data carrier.

18. Method as defined in claim 16, characterized in that a hard disk memory is used as intermediate storage means.

19. Method as defined in claim 14, characterized in that the data carriers are arranged in data carrier cassettes of an archive system and that the data carrier cassettes are stored within the archive system in a storage unit, are read or written on in at least one read/write unit and transported back and fort between the read/write unit and the storage unit by a transfer unit.

20. Method as defined in claim 19, characterized in that the archive storage means is controlled by a data storage control.

21. Method as defined in claim 20, characterized in that the data storage control operates in addition with a hard disk memory operated by the data storage control parallel to the archive storage means.

22. Method as defined in claim 20, characterized in that the data storage unit is controlled by the data storage control in such a manner that the long-term storage of the data takes place in the archive storage means by means of the data carriers and moreover the data storage control communicates with the computer as a single storage unit.

23. Method as defined in claim 22, characterized in that the data coming from the computer or made available to the computer is stored temporarily in the hard disk memory.

24. A method comprising the steps of:

providing data sequences from a number data;

providing at least one data group from N data sequences, wherein N is a natural number;

generating a final test data sequence for said data group using said N data sequences, wherein said final test data sequence is generated by:

(a) using a kth data sequence, where k is one, to form a kth preliminary test data sequence;

(b) incrementing k by 1;

(c) combining a kth data sequence with the (k−1)th preliminary test data sequence on a bit-by-bit basis by performing a parity operation to form a kth preliminary test data sequence;

(d) storing said kth preliminary test data sequence;

(e) repeating steps (b), (c) and (d) until k=N, wherein said Nth preliminary test data sequence is said final test data sequence.

25. Method as defined in claim 1, characterized in that the data carriers are arranged in data carrier cassettes of an archive system and that the data carrier cassettes are stored within the archive system in a storage unit, are read or written on in at least one read/write unit and transported back and forth between the read/write unit and the storage unit by a transfer unit.

26. Method as defined in claim 25, characterized in that the archive storage means is controlled by a data storage control.

27. Method as defined in claim 26, characterized in that the data storage control operates in addition with a hard disk memory operated by the data storage control parallel to the archive storage means.

28. Method as defined in claim 26, characterized in that the data storage unit is controlled by the data storage control in such a manner that the long-term storage of the data takes place in the archive storage means by means of the data carriers and moreover the data storage control communicates with the computer as a single storage unit.

29. Method as defined in claim 28, characterized in that the data coming from the computer or made available to the computer is stored temporarily in the hard disk memory.

* * * * *

UNITED STATES PATENT AND TRADEMARK OFFICE
CERTIFICATE OF CORRECTION

PATENT NO. : 6,233,579 B1
DATED : May 15, 2001
INVENTOR(S) : Lechner

It is certified that error appears in the above-identified patent and that said Letters Patent is hereby corrected as shown below:

Column 10, claim 9,
Line 34, the word "sequence" should be deleted and the word -- sequences -- substituted therefor.

Column 11, claim 19,
Line 12, the word "fort" should be deleted and the word -- forth -- substituted therefor.

Column 11, claim 24,
Line 32, the word "providing" should be deleted and the word -- forming -- substituted therefor.

Signed and Sealed this

Sixteenth Day of April, 2002

Attest:

JAMES E. ROGAN
Attesting Officer
Director of the United States Patent and Trademark Office